United States Patent Office 3,341,371
Patented Sept. 12, 1967

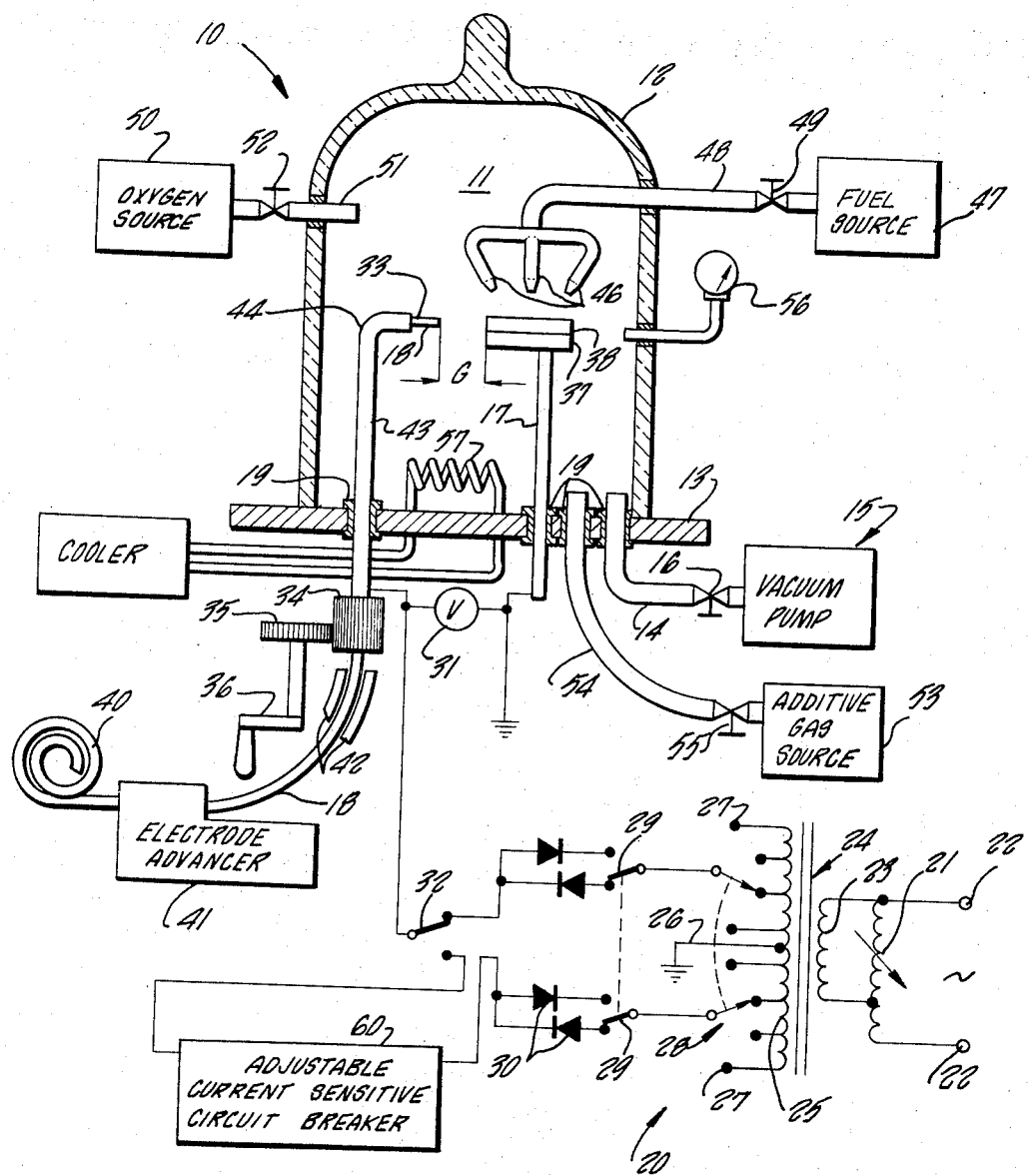

3,341,371
ELECTROSTATIC METHOD FOR TREATING METALS
Cecil A. Baumgartner, 918 E. Bennett Ave., Glendora, Calif. 91740
Filed May 31, 1966, Ser. No. 554,201
10 Claims. (Cl. 148—20.3)

ABSTRACT OF THE DISCLOSURE

A method of treating metal parts by heating the part to an elevated temperature less than the melting point of the metal, and by cooling the part while the part is impressed with an electric potential of selected polarity and magnitude. Where the part has a negative potential applied to it while cooling takes place, the metal is annealed, whereas a positive potential produces hardening of the metal in most cases.

---

This application is a continuation-in-part of application Ser. No. 324,517, filed Nov. 18, 1963, now abandoned.

This invention relates to thermo-electrostatic treatment of metals, and more particularly, to method and apparatus for electrostatic annealing and hardening of metal parts.

Many metals, particularly refractory metals such as chromium, columbium, tantalum, molybdenum, tungsten and alloys of these and other metals, are presently difficult to machine by conventional methods. Super alloys and other metals such as titanium and beryllium are also difficult to machine. Unless it is extremely pure, titanium, for example, is a very costly material to machine, as compared to mild steel. At present, if titanium is to be machined on a lathe or milling machine, it is necessary to use very hard cutting tools, such as diamond or carbide tipped tools, and to provide a comparatively slow speed of the workpiece past the cutting tool. It is also necessary to take a small cut from the workpiece with each pass of the cutting tool. Even when these conditions are met, the wear of the cutting tool is quite high. As a result, the machining of titanium and many other refractory metals is a costly and time consuming process. If the abovementioned conditions are not met, tool wear is even more extreme and the finish imparted to the workpiece is degraded; in many instances, as with titanium, the surface of the workpiece becomes torn and pitted or, as with tungsten, the workpiece may shatter or break.

Little is presently known with certainty about why one metal is more machinable than another metal; some people assert that the machinability of a metal is related to its crystal structure, but there are some notable unexplained exceptions to this theory. At present, therefore, the machinability index of a given metal is determined by an empirical comparative process. A standardized metal piece made of a reference metal is machined under conditions in which the type, shape and condition of a reference tool are known, and in which the speed of the workpiece past the tool and the cut of the tool into the workpiece are known. These same conditions are then reproduced as closely as possible in machining a second standardized piece made from another material. Many factors, including the final condition of the tool, the visible appearance of the machined surface of the workpiece, and the nature of the metal chips produced during the machining operation are then evaluated relative to the reference metal. These factors are then weighted pursuant to an empirical formula to produce a composite number indicative of the machinability of the second metal relative to the reference metal. The machinability index number of any given metal composition cannot be predicted with any degree of accuracy.

This invention proceeds from the discovery that certain physical properties of a metal, particularly its machinability, may be altered by cooling the metal from an elevated temperature to near room temperature while the metal is subject to a high voltage direct current potential of desired polarity but without measurable current flow through the metal. Where the metal part is connected to the negatively charged electrode, it has been found that, in most instances, the benefits of annealing are obtained in that the properties of ductility and malleability are improved. Where the metal part is connected to the positively charged electrode, it has been found, in most instances, that the material hardens with a corresponding reduction in ductility and malleability.

Generally speaking, in terms of apparatus, the present invention provides a metal treating device which includes a pair of electrodes. The device includes means for impressing a high voltage, substantially direct current potential across the electrodes and means for supporting a heated metal part to be treated on one of the electrodes. The device also includes means for controlling the polarity of the potential to which the part is subjected and means for initially heating the part to a desired elevated temperature. The apparatus also includes means for cooling the part while the desired potential is impressed thereon from the elevated temperature to a lower temperature. The arc is then extinguished.

The term "soaking potential" is used herein to refer to the potential to which a metal part is subjected while cooling from an elevated temperature to a lower temperature, and such a potential does not per se produce any significant heating of the metal part. As a result, the word "soaking" in the term "soaking potential" has no relation to the technique of "soaking" a metal billet or the like in a furnace for a desired time in accord with conventional heat treating methods which are essentially dependent upon wholly thermodynamic manipulations upon a metal.

The term "arc" as used herein, unless specifically indicated to be otherwise, refers to an electric discharge through or in a gaseous medium which produces an effect susceptible of visual observation, and encompasses both a corona discharge phenomenon as well as the type of brilliant discharge associated with the thunderstorm or with the operation of an arc lamp.

The above-mentioned and other features of the present invention are more fully described in the following detailed explanation of the invention taken in conjunction with the accompanying drawing which shows apparatus having utility in practicing the method of the present invention.

The drawing shows a metal treating apparatus 10 which includes a chamber 11 defined interiorly of a bell jar 12 mounted upon a supporting base 13. An evacuator duct 14 communicates from the chamber through the base to a vacuum pump 15 via a control valve 16. Preferably the vacuum pump is of conventional commercial manufacture and therefore is not described in detail herein. A pair of electrodes 17 and 18 are disposed in the chamber in spaced apart relation to one another to define an air gap G. The electrodes are mounted to base 13 by means of suitable vacuum seals 19 which permit axial and rotatable movement of the electrodes relative to the base.

Apparatus 10 includes means for impressing a high voltage direct current potential of selected polarity between the electrodes. An adjustable high voltage DC potential source 20 includes an adjustable transformer 21, such as a Variac transformer, connected to a pair of terminals 22 between which an AC signal may be applied.

The output of transformer 21 is to the primary winding 23 of a voltage step-up transformer 24 having a multiply tapped secondary winding 25. The taps of the secondary winding include a grounded center tap 26 and two sets of output taps 27. Each set of output taps is connected to a respective section of a potential selecting switch 28, the movable elements of which are connected to a respective one of a pair of ganged single-pole double-throw polarity reversing switches 29. The movable element of each switch cooperates between a pair of rectifiers 30 which are connected in opposition to each other. The rectifiers are commonly connected to electrode 18 via a switch 32. Switch 32 is operable to select or by-pass an adjustable current-sensitive circuit breaker 60. Electrode 17 is grounded. Accordingly, the DC potential source provides for selection of a number of ranges of full wave rectified DC potential via switch 28, for adjustment of the DC potential within a given range via transformer 21, and for reversal via switches 29 of the polarity of the potential applied to electrode 18 relative to electrode 17. A voltmeter 31 is connected between the electrodes.

The apparatus further includes means for moving the electrodes relative to one another to vary air gap G. To this end, the upper extent of electrode 18 defines a horizontal extension portion 33. A driven gear 34 is connected to the lower end of electrode 18 below the base. A drive gear 35 is engaged with the driven gear and is adapted to be rotated by means of a crank 36 to rotate electrode 18. The driven gear is elongated axially of electrode 17 so that the electrode may be moved axially and still be operatively connected to drive gear 35.

A workpiece holder 37, preferably fabricated of graphite, for supporting a metal part 38 is connected to the upper end of electrode 17 and is so constructed that a part engaged with the holder is conductively coupled to the electrode.

It has been found that the electrode spaced from the workpiece is treated in a reverse manner to the workpiece as the metal treating process is carried out. It has also been found that such treatment of the electrode (electrode 18) causes a reduction in the efficiency of the process. For example, if the apparatus described above is used to anneal a series of workpieces, it has been found that each workpiece is annealed to a slightly lesser extent than the preceding workpiece even though the temperatures, voltages and time periods used in treating the several workpieces are identical.

The efficiency of the processes of the invention may be maintained at a constant level if electrode 18 is periodically renewed or replaced, or if the electrode is consumable during the period that the heating arc is established. In the latter case, electrode 18 is a graphite or copper rod, for example, and is mounted in means which slowly advance the electrode as it is consumed so as to maintain the air gap G at a constant dimension. Accordingly, as shown in the drawing, electrode 18 preferably is provided in the form of a coil 40 of copper rod, for example. The rod is passed from the coil through an electrode rod advancer 41 and then between a pair of guide blocks 42. The guide blocks direct the electrode rod into a hollow electrode sleeve 43 which is engaged in one of seals 19 and which carries gear 34 at its lower end. Sleeve 43 has a lateral bend portion 44 at its upper end inside the vacuum chamber for defining horizontal extension portion 33 of electrode 18. The electrode advancer provides for slowly feeding the electrode rod into sleeve 43 when an arc exists between the metal part and electrode 18 so that the extent of air gap G is held constant while the arc exists. Electrode rod 18 is consumable and, accordingly, the efficiency of the process is kept constant.

The electrical connection of the voltmeter to electrode 18 is made by way of sleeve 43. The connection of gear 34 to sleeve 43 is non-conductive.

The apparatus described above is exemplary of apparatus with which the method of this invention may be carried out. Those skilled in the art will understand that a different DC potential source may be used, and that other means may be used for moving the electrodes relative to one another. The vacuum chamber is not required in all casses. Parameters to be considered in determining whether a vacuum chamber should be used are set forth below.

Apparatus 10, for the purposes of being fully effective in the practice of the procedures involved in this invention, includes means for heating a metal part disposed on pedestral 37 to a desired elevated temperature. Accordingly, a plurality of gas jets 46 are disposed above the pedestal for directing flames toward a metal part placed on the pedestal. The jets are connected to a fuel source 47 located outside chamber 11 via a suitable duct 48 including a valve 49. The gas jet heating mechanism described and illustrated is presented merely for the purposes of example; it is within the scope of the invention that any suitable heating mechanism, such as an electrical induction heater, may be used as desired. An oxygen source 50 is provided outside the chamber, and oxygen is introduced to the chamber from the source via a duct 51 controlled by a valve 52.

In certain procedures according to this invention, it is desirable that a metal part being treated be subjected to a special atmosphere. Accordingly, an additive gas source 53 is located outside chamber 11 and is connected to the chamber via a duct 54 controlled by a valve 55.

A pressure gage 56 is also connected to the chamber for monitoring the pressure present in the chamber at any given time.

A cooling coil 57 mounted in chamber 11 is supplied with circulating coolant from a cooler 58 located outside the chamber.

It is desirable that there be no significant, i.e., essentially no measurable, current flow through a metal part undergoing treatment while the soaking potential is applied to the part. Adjustable current-sensitive circuit breaker 60 may be placed into the circuitry of the apparatus by switch 32, as desired. The breaker functions to interrupt a soaking potential applied to a part if current above a selected level flows through the breaker. In this manner, proper performance of the method of this invention is assured.

Basically, the metal treating procedure practiced according to this invention involves heating a metal part to an elevated temperature, cooling the heated part to a lower temperature, preferably a temperature near room temperature, and subjecting the part during the cooling process to a high voltage potential of desired magnitude and polarity. The extent of the initial heating, the rate of cooling, and the magnitude of the impressed potential are all variables which have significant effect upon the nature of the changes wrought in certain physical properties of the treated part. Additional factors having an effect in the process are the nature of the heating mechanism used, the gas pressure around the part during the treating process, and the nature of the atmosphere around the part. It has been found, however, that the polarity of the impressed potential is the variable which has the greatest effect upon the results obtained in treating a part.

It has been discovered that, as a general rule, when the part being treated is negatively charged, the part is treated in a manner akin to annealing in that the ductility and the maleability, but most particularly the machinability, of the part are improved. Conversely, as a general rule, where the part is positively charged (i.e., the part is deficient in electrons relative to an adjacent electrode) during the cooling process, the effect upon the part is that the ductility, the malleability, and the machinability of the part are reduced. These changes in the properties of the metal part take place without lowering tensile strength of the metal to any appreciable extent, and in some cases the tensile strength of the part is increased.

For example, if it is desired to treat a quantity of titanium to increase its machinability, the part is heated in chamber 11 to an elevated temperature below but approaching the melting point of the metal. As soon as the part has been heated to the proper temperature, circuit 20 is operated to impress a high voltage D.C. potential between electrodes 17 and 18, and this potential is maintained under conditions which do not produce an arc between the electrodes while the part is cooled to about room temperature and so that there is no significant current flow through the part. The high voltage D.C. potential is applied so that the titanium part is negative with respect to electrode 18. Preferably the potential applied between the electrodes is at least about 2500 volts, and the higher the applied voltage the greater the desired effect and the more rapidly the part may be cooled from its initial elevated temperature.

More specifically, in a preferred procedure according to this invention, a metal part such as a titanium part is engaged with holder 37 so that air gap G of desired dimension is defined between the point of the part most proximate to the cantilevered end of laterally extending portion 33 of electrode 18. Bell jar 12 is then disposed over the electrodes and vacuum pump 15 is placed into operation to evacuate chamber 11 to a desired pressure below atmospheric presure. Once the desired degree of evacuation of the chamber is attained, circuit 20 is operated so that the polarity of the part is negative with respect to electrode 18, and a potential is impressed across the electrodes of a magnitude sufficient to cause an arc to be produced between the electrodes. The arc is relied upon to cause the part to be heated to a temperature below but near the melting point of the part. While the arc exists, the advancer mechanism for electrode 18 is operated so that consumption of electrode 18 does not produce an increase in the extent of the air gap. The arc is maintained across the air gap until the part has been heated to a predetermined temperature. When this process is carried out at a subatmospheric pressure, the arc appears as a corona discharge around the part under treatment. As soon as the desired temperature has been obtained, the arc is extinguished either by rotating electrode 18 to increase the distance across the air gap to an extent that the arc cannot sustain itself, or by reducing the voltage impressed across the electrodes, or by increasing the air pressure in chamber 11, or by a combination of these steps. Polarity reversing switch 29 need not be operated in this case. Switch 28 and transformer 21 are adjusted so that the desired soaking potential is applied between the electrodes. Switch 32 is operated to place circuit breaker 60 in the circuit. The magnitude of air gap G is adjusted so that no arc exists between electrode 18 and the part. Since no arc is present, there is essentially no current flow through the part. The part is thereafter cooled to about ambient temperature with the negative high voltage soaking potential impressed thereon. The potential applied to the part during the cooling process may be less than the potential applied to heat the part, but it is preferred that the soaking potential be higher than the heating potential for the reasons mentioned above. The treated titanium part has significantly enhanced machinability in comparison with an identical part not so treated.

A simple way in which to accomplish the procedure set forth above is to note, during the existence of a heating arc, the magnitude of gap G and to note, at the same time, on voltmeter 31 the magnitude of the potential applied during the initial arc heating process. After the part has been heated to the desired temperature, the arc can be extinguished by rotating electrode 18 away from the part. Circuit 20 then may be adjusted to produce across the electrodes a potential known to be just insufficient to produce an arc when electrode 18 is rotated back to its former position. The procedure is then resumed merely by rotating electrode 18 back to its former position. This procedure may be used to advantage where the soaking potential desired is of about the same magnitude as or less than the magnitude of the potential required during the heating process. Where the soaking potential is to be higher than the heating (arcing) potential, the magnitude of the air gap must be increased or the pressure in chamber 11 must be increased, or both.

It is preferred that an arc be used to heat the metal part in most cases for efficiency. Where it is desired to treat the entire surface of a metal part, or to give a treatment which extends to all or a significant portion of the volume of the part, it is preferred that the arc heating process be carried out under subatmospheric pressure so that the arc takes the form of a corona discharge enveloping the part. The lower the pressure in chamber 11, the more completely the corona envelops the part. As a corollary, the pressure around the part may be regulated to control the extent to which a part is heated during the arc heating process.

Where the metal part to be treated is not made of a refractory metal, the use of an arc heating process may damage the part. In such a case, the use of gas jets 46 is preferred.

It has been found that the presence of certain gases around the metal part during the process has beneficial effects. For example, if during the above-described treatment of titanium to enhance its machinability, an acetylene-rich atmosphere is present in chamber 11, the ductility and machinability of the treated part is better than would be the case if such an atmosphere were not present. The presence of an oxygen-rich atmosphere produces an opposite result.

It has also ben found that the purity of the D.C. potential applied across the electrodes during the cooling process has an effect. Full-wave rectified D.C. power is preferred to half-wave rectified power.

From the foregoing, it is apparent that the metal treating effects produced by the practice of this invention are reversible. As a result, it is possible to treat a part to increase its machinability prior to fabrication of a desired product from the metal, and then to reverse treat the product as desired to increase its hardness.

Certain refractory metals can be formed into rods and billets only by the use of the techniques of powder metallurgy; such a refractory metal is tungsten. Tungsten parts are notoriously difficult to machine because the parts break frequently during the machining process. This invention has particular utility in improving the machinability of tungsten. For example, a tungsten rod (fabricated by powder metallurgy techniques) 1½ inches long and ¼ inch in diameter was treated in accord with the foregoing description by cooling the part from a temperature of about 2000–2500° F. while subjected to a soaking potential of from 2000–2500 volts applied so that the part was negatively charged. The soaking potential was applied for about 5 minutes. The part was initially heated by an arc heating procedure wherein the arc potential was approximately 2500 volts and the part was positively charged. After the thermo-electrostatic treatment process was completed, a ¼ inch long section of the treated rod was heated to a temperature of about 1000° F. and was placed in a press for deformation testing. It was found that the ¼ inch segment of the rod could be subjected to 65 percent deformation without showing cracks and other adverse effects. Prior to the use of the above-described method to treat such a rod, a ¼ inch length of ¼ inch diameter rod could be deformed only about 40 percent at 3000° F. before it cracked. The remainder of the rod was then heated to 1000° F., placed in a thread roller and threads were rolled thereon. Prior to the use of the method of this invention to anneal a tungsten rod, threads could not be rolled on such a rod at any temperature without producing cracking of the material.

The general rule regarding soaking potential polarity is that, if the part being treated is negatively charged by the applied soaking potential as the part is cooled from an elevated temperature, the machinability of the part will be enhanced and its hardness will be reduced. One exception to this general rule has been discovered to date. The exception is an alloy known as René 41, sold by General Electric Company. It has been found that if this alloy is treated in a manner which would cause titanium to soften, the hardness of the alloy increases from Rockwell C19 to Rockwell C34, but the machinability of the alloy is increased in accord with the general rule.

While the invention has been described above in conjunction with specific apparatus and in conjunction with specific parameters applicable to the method, this has been by way of example only and is not to be considered as limiting the scope of this invention.

What is claimed is:

1. A method for treating a metal part to alter selected physical properties thereof including the steps of
   (a) heating the part to a selected temperature elevated above room temperature,
   (b) cooling the part from the elevated temperature to a selected lower temperature at a selected rate, and
   (c) impressing on the part during at least the initial portion of the cooling step an electrostatic charge of selected magnitude and polarity.

2. The method according to claim 1 wherein said selected elevated temperature is below but approaches the melting point of the metal from which the part is made.

3. The method according to claim 1 including the step of subjecting the part during the cooling procedure to an atmosphere of selected composition.

4. The method according to claim 3 wherein the part is made of titanium, said charge is negative, and said atmosphere contains acetylene.

5. The method according to claim 1 wherein said cooling procedure is carried out at a selected pressure below atmospheric pressure.

6. The method according to claim 1 including
   (a) disposing the heated part on one of a pair of spaced electrodes,
   (b) impressing between the electrodes during the cooling step a high voltage DC potential of selected magnitude and polarity, and
   (c) spacing the other electrode from the part a distance sufficient, in connection with the magnitude of the impressed potential and the nature of the medium between said other electrode and the part, to prevent the generation of an arc between said other electrode and the part.

7. The method according to claim 6 wherein the heating step is accomplished by impressing between the electrodes a DC potential sufficient in magnitude to produce an arc between said other electrode and the part.

8. The method according to claim 7 wherein said heating step is carried out under subatmospheric pressure.

9. The method according to claim 7 wherein the arc is manifested by a corona discharge at least partially enveloping the part.

10. The method of altering the physical properties of a metal part comprising the steps of
    (a) heating the part to a selected elevated temperature,
    (b) disposing the heated part on one of two spaced electrodes,
    (c) impressing between the other electrode and the part a DC potential of predetermined polarity and of selected value insufficient to create an arc between the part and the other electrode, and
    (d) cooling the part to a predetermined reduced temperature with the potential impressed therein.

References Cited
UNITED STATES PATENTS

| | | | |
|---|---|---|---|
| 2,273,819 | 2/1942 | Cooke et al | 219—69 |
| 2,853,408 | 9/1958 | Stengel | 219—72 |

OTHER REFERENCES

Jones, "How to Use Helium-Shielded Arc Welding," A Special American Machinist-Report To The Metalworking Industries, 1948, McGraw Hill Pub. Co., New York, relied on pages 1–7.

HYLAND BIZOT, *Primary Examiner.*

CHARLES N. LOVELL, *Examiner.*